Dec. 11, 1962 R. I. KREISLER ETAL 3,068,459
APPARATUS FOR INDICATING THE LIQUID OR
GASEOUS STATE OF A FLUID
Filed April 4, 1957
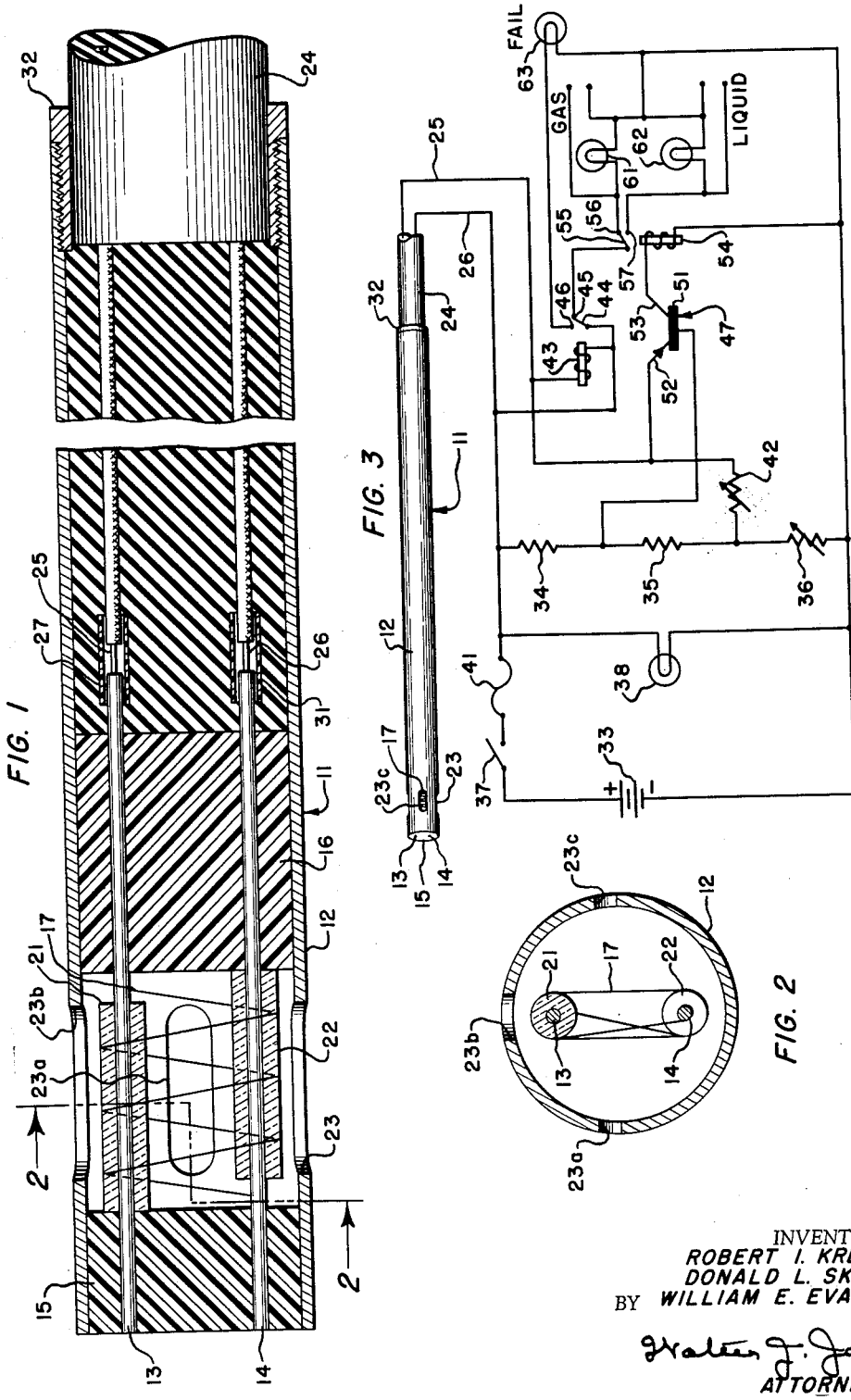
INVENTORS
ROBERT I. KREISLER
DONALD L. SKAAR
WILLIAM E. EVANS, JR.
BY
ATTORNEY

United States Patent Office 3,068,459
Patented Dec. 11, 1962

3,068,459
APPARATUS FOR INDICATING THE LIQUID OR GASEOUS STATE OF A FLUID
Robert I. Kreisler, William E. Evans, Jr., and Donald L. Skaar, San Diego, Calif., assignors to General Dynamics Corporation, San Diego, Calif., a corporation of Delaware
Filed Apr. 4, 1957, Ser. No. 650,585
4 Claims. (Cl. 340—236)

This invention relates to fluid state indicating apparatus, and more particularly to a device for indicating the presence of the liquid or gaseous state of a fluid.

Many types of gases are employed in industrial operations. Since gases in the liquid state are more easily transported and stored, while the gas is usually utilized in the gaseous state, it is frequently necessary to determine whether the gas at some point is in the liquid state or in the gaseous state. Exemplarily a measurement of the level of the liquefied gas in a container, an indication of whether the liquid or gas is flowing in a pipe or conduit may be desired, or actuation of a control may be required when the liquefied gas reaches a critical level in a container.

The low temperatures of gases in the liquid state, ranging down to −269 degrees C. for helium impose severe limitations on such indicating apparatus. Chemically active liquefied gases, such as liquid oxygen, impose further limitations. Heretofore known indicating devices have included capacitance probe devices and float actuated switches. Capacitance probes are large and bulky, require a complex electronic capacity measuring device, are difficult to calibrate, and tend to drift. Float actuated switches are also bulky, frequently fail at the low temperatures of liquefied gases, and are sensitive to vibration.

The liquefied gas indicator of this invention includes a sensing probe adapted for mounting in a liquefied gas container and an external indicating and control circuit. The sensing probe includes a fine wire mounted in a suitable housing. A pair of conductors connect the probe to the indicating and control circuit. The indicating and control circuit allows a small current to pass through the probe, heating the fine wire. Since the heat transfer coefficient is greater in liquid than in gas, the wire is cooler in liquid than in gas. Change in resistance of the wire due to the temperature coefficient of resistance is measured by a simple circuit which also provides indications and control signals representing the presence of gas in either the liquid or gaseous state. In addition, a failure indication is provided upon failure of the sensing probe. The indicating device of this invention is light and compact, simple, reliable, not susceptible to drift, has rapid response, is easily calibrated, and may be operated under the extreme conditions imposed by the low temperature and chemical activity of liquid oxygen and the even lower temperature of liquid helium.

It is, therefore, an object of this invention to provide a device for indicating the presence of a liquefied gas.

Another object of this invention is to provide a liquefied gas sensing device capable of operation at extremely low temperatures.

Another object of this invention is to provide a liquefied gas indicator having a sensing probe suitable for employment in a liquid oxygen environment.

Another object of this invention is to provide a liquefied gas indicator sensitive to the difference in the heat transfer coefficient between a liquid and a gas.

Another object of this invention is to provide a liquefied gas indicator having a heated element in contact with the gas.

Another object of this invention is to provide a liquefied gas indicator responsive to the change in temperature of a heated element due to a change in environmental heat transfer coefficient.

Another object of this invention is to provide a liquefied gas indicator having an electrical circuit responsive to the temperature coefficient of resistance of a heated element.

Another object of this invention is to provide a liquefied gas indicator which is inexpensive, light, compact, simple, reliable, fast acting, and capable of operation in liquid oxygen and liquid helium.

These and other objects of this invention will readily become apparent as the following specification is studied in the light of the accompanying drawings, wherein:

FIGURE 1 is a longitudinal cross-sectional view of a liquefied gas detecting probe, FIGURE 2 is a transverse cross-sectional view of a portion of the probe of FIGURE 1, and FIGURE 3 is a diagrammatic representation of the circuit employed in connection with the probe of FIGURE 1.

Referring now to FIGURES 1 and 2 of the drawings, probe 11 includes a tubular supporting body 12 fabricated of a suitable inert material, exemplarily, a stainless steel. Two conductive rods, 13 and 14, aligned parallel to the longitudinal axis of supporting body 12, are supported by electrically insulating cylindrical plugs 15 and 16. Rods 13 and 14 may conveniently be fabricated of a suitable chemically inert conductive material similar to that of supporting body 12. Cylindrical plug 15 is positioned at one end of supporting body 12, while cylindrical plug 16 is spaced from plug 15. Cylindrical plugs 15 and 16 are fabricated of a suitable chemically inert, electrically insulating synthetic resin, exemplarily, tetrafluoroethylene resin.

Sensing element 17, comprising several turns of a fine conductive filament of a suitable conductive, chemically inert material such as platinum or tungsten having one end suitably connected as by soldering, brazing or welding to conductive rod 13 and the other to conductive rod 14, is positioned between plugs 15 and 16. Sensing element 17 is electrically and thermally insulated from conductive rod 13 by an insulating sleeve 21, and from conductive rod 14 by an insulating sleeve 22, except at the extreme ends of the element connected to conductive rods 13 and 14, as disclosed hereinabove. Insulating sleeves 21 and 22 may be fabricated of a suitable glass or ceramic material, or of the same synthetic resin as are plugs 15 and 16. A plurality of apertures 23, 23a, 23b and 23c, through the walls of tubular supporting body 12, enable thermal contact between the filamentary sensing element 17 and the gaseous or liquefied gas.

Conductive rods 13 and 14 are connected to an external circuit through cable 24, containing insulated wires 25 and 26. Wire 25 is connected to conductive rod 13 and wire 26 is connected to conductive rod 14 by soldering, brazing, welding, or other suitable means. Insulating sleeves 27 and 31, of any suitable synthetic resin, are provided at the junctions of wire 25 and rod 13, and of wire 26 and rod 14, respectively. The interior of tubular body 12 between insulating plug 16 and jacket of cable 24 is filled with a suitable synthetic resin, such as an epoxy resin, by means of the process known as "potting." As is well known in the art, the liquid resin is injected into the cavity and cured to the solid state therein. A threaded locking ring 32, cooperating with a mating thread on tube 12, secures cable 24 to body 12.

Referring now to FIGURE 3, a suitable direct voltage power supply such as battery 33 is connected to a voltage divider comprising serially connected resistors 34, 35 and 36 through a switch 37 and fuse 41. A pilot lamp 38 is connected across the voltage divider. Filament 17 of sensing probe 11 is connected across resistors 34 and 35 in series with adjustable resistor 42 by means of conductors 25 and 26. A first relay 43 is connected in parallel relationship to filament 17. Relay 43 is provided with transfer contacts including movable contact 44, normally closed contact 45, and normally open contact 46.

A transistor 47, which may conveniently be of the p-n-p type, has a base 51 connected to the junction between resistors 34 and 35, an emitter 52 connected to conductor 25 between filament 17 and resistor 42, and a collector 53 connected to the negative terminal of battery 33 through the coil of a second relay 54.

Relay 54 is provided with a movable contact 55, normally closed contact 56, and normally open contact 57. Movable contact 55 is connected to the positive terminal of power supply 33 through normally closed contact 45 and movable contact 44 of relay 43, conductor 26, fuse 41 and switch 37. Normally closed contact 56 is connected to "Gas" indicating lamp 61 and an external contact circuit, not part of this invention. Similarly, normally open contact 57 is connected to "Liquid" indicating lamp 62, and an external control circuit. A failure indicating lamp 63 is connected to normally open contact 46 of relay 43. The circuits to lamps 61, 62 and 63 are completed by connection to the negative terminal of power supply 33. Although transistor 47 is provided herein to amplify the current change through filament 17 to an amount sufficient to operate relay 54 it will be apparent to one skilled in the art that a sufficiently sensitive polarized relay would not require such amplification.

As disclosed hereinabove, probe 11 may be mounted in a pipe or other vessel for determining whether the gas therein is in the liquid or gaseous state, may be fixed within a vessel for indicating the state of the contents at a fixed level, or may be movably mounted within a vessel for determining the height of the gas-liquid interface. Illustratively, the probe 11 may be mounted in a pipe transporting a liquefied gas. An indication of the state of the gas and provision of a control signal to other apparatus dependent upon the state of the material in the pipe is frequently necessary to control an operation or process.

Direct current provided by power source 33 flows through filament 17 in probe 11, and through adjustable resistors 42 and 36 upon closure of switch 37. Filament 17 is heated by the current flowing therein. When filament 17 is in contact with the material in its gaseous state, the temperature of the filament is relatively high. The positive temperature coefficient of resistance of the filamentary material causes the resistance of the filament to increase to a relatively high value. Heat transfer from the heated filament to gas in the liquefied state is much greater than to the material in its gaseous condition. Therefore, the temperature of the filament is reduced, along with the filament resistance. Exemplarily, the resistance of the filament 17 in a gas such as oxygen approximately may be 10 ohms, while in liquefied oxygen it may be only one or two ohms.

Variation of resistance of filament 17 results in a varying voltage drop thereacross, as is well known to the art. Consequently, the voltage applied to emitter 52 of transistor 47 varies inversely with the resistance of filament 17.

Liquefied gas in contact with filament 17 causes the voltage drop across the filament 17 to be low in comparison with the voltage drop across resistors 36 and 42. The voltage at emitter 52 becomes positive with respect to the fixed voltage applied to the base 51 by the voltage divider comprising resistors 34, 35 and 36. Current flows through emitter 52, and, consequently, a larger current flows through collector 53. Current flowing in the collector circuit actuates relay 54, transferring movable contact 55 to fixed contact 57 and applying power to "Liquid" indicating lamp 62. An external control circuit, not part of this invention, may also be actuated by actuation of relay 54.

As gas in the liquefied state is replaced by the gaseous state at the filament 17, the heat transfer decreases, filament temperature increases, and resistance of the filament increases. The voltage drop across the filament increases, lowering the voltage at emitter 52 below the voltage applied to base 51. Transistor 47 ceases to conduct, releasing relay 54. Movable contact 55 returns to contact 56, closing the circuit containing "Gas" indicator lamp 61. An external control circuit, not part of this invention, may also be actuated. Exemplarily, a valve may be closed to prevent gas from entering a container being filled with a liquefied gas.

A failure indicating circuit, comprising relay 43 and "Fail" indicating lamp 63 is also included. Failure of probe 11, such as burnout of filament 17, causes the voltage across the high resistance coil of relay 43 to rise to almost that of power supply 33. Since, in normal operation, the relatively low resistance sensing filament 17 is connected in parallel with the high resistance coil of relay 43, the relay coil normally has substantially no effect on the operation of the probe or circuit. The relay remains unoperated since the voltage drop across the relay coil and filament in parallel is low, due to resistors 36 and 42 in series with power source 33. Failure of the sensing probe removes the low resistance filament from the circuit, placing the high resistance coil of relay 43 in series with resistors 36 and 42 increasing the voltage across the relay coil and actuating the relay. Actuation of relay 43 transfers movable contact 44 from fixed contact 45 to fixed contact 46. The transfer operation removes power from indicating lamps 61 and 62 and their associated external control circuits, and applies power to illuminate "Fail" indicating lamp 63 and to actuate an external alarm or control circuit, not shown, if desired.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. Indicating apparatus comprising a detector adapted for immersion in a fluid having a liquid state with a first heat transfer coefficient and a gaseous state with a second heat transfer coefficient, said detector including a hollow metal body enclosing a supporting plug of insulating material, a pair of conductive rods held by said supporting plug in parallel spaced relationship, a filament having a temperature coefficient of resistance electrically connected to and supported by said rods in heat transfer relationship with said fluid whereby a first temperature and resistance level is associated with said liquid state and a second temperature and resistance level is associated with said gaseous state, a remote fluid state indicator including an electrical circuit connected to said rods for heating said filament, and a switching circuit energizing a first indicating circuit in response to said first resistance level and energizing a second indicating circuit in response to said second resistance level.

2. Indicating apparatus comprising a detector adapted for immersion in a fluid having a liquid state with a first heat transfer coefficient and a gaseous state with a second heat transfer coefficient, said detector including a hollow metal body enclosing a supporting plug of insulating material, first and second conductive rods held by said supporting plug in parallel spaced relationship, first and second insulating sleeves supported by said rods, a filament wound between said insulating sleeves with one end connected to said first conductive rod and another end connected to said second conductive rod, said filament having a temperature coefficient of resistance, whereby in heat transfer relationship with said fluid, a first temperature and resistance level is associated with said liquid state and a second temperature and resistance level is associated with said gaseous state, a remote fluid state indicator including an electrical circuit connected to said first and second rods for heating said filament, and a switching circuit energizing a first indicating circuit in response to said first resistance level and energizing a second indicating circuit in response to said second resistance level.

3. Indicating apparatus comprising a detector adapted for immersion in a fluid having a liquid state with a first heat transfer coefficient and a gaseous state with a second heat transfer coefficient, said detector including a metallic sensing filament conducting a heating current and having a temperature coefficient of resistance in heat transfer relationship with said fluid whereby a first temperature and resistance level is associated with said liquid state and a second temperature and resistance level is associated with said gaseous state, a remote fluid state indicator including a first electrical circuit comprising said metallic filament and a resistor in series relation with a source of electrical current, a first junction point at the junction of said filament and said resistor providing a first voltage level at said first junction point in response to said first resistance level and a second voltage level at said first junction point in response to said second resistance level, a second electrical circuit in parallel with said first electrical circuit, said second electrical circuit including first and second resistors in series and a second junction point having a reference voltage level between said first and second resistors, a transistor responsive to the difference in voltage between said first and second junction points having a base connected to said second junction point, an emitter connected to said first junction point and a collector, a relay in circuit with said collector, a first indicating circuit connected to said relay and energized in response to said first voltage level, a second indicating circuit connected to said relay and energized in response to said second voltage level, and detector failure indicating means including a relay connected in parallel with said metallic filament, and a failure indicating circuit energized in response to opening of said metallic filament.

4. Indicating apparatus comprising a detector adapted for immersion in a fluid having a liquid state with a first heat transfer coefficient and a gaseous state with a second heat transfer coefficient, said detector including a hollow body enclosing a supporting plug of insulating material, first and second conductive rods held by said supporting plug in spaced relationship, first and second insulating sleeves supported by said rods, a filament wound between said insulating sleeves with one end connected to said first conductive rod and another end connected to said second conductive rod, said filament having a temperature coefficient of resistance whereby, in heat transfer relationship with said fluid a first temperature and resistance level is associated with said liquid state and a second temperature and resistance level is associated with said gaseous state, a remote fluid state indicator including a first electrical circuit comprising said filament and a resistor in series relation with said power source, a first junction point at the junction of said filament and said resistor whereby a first voltage level appears at said first junction point in response to said first resistance level and a second voltage level appears at said first junction point in response to said second resistance level, a second electrical circuit in parallel relationship with said first electrical circuit, said second electrical circuit including a pair of resistors and a second junction point, a transistor responsive to the difference in voltage between said first and second junction points having a base connected to said second junction point, an emitter connected to said first junction point, and a collector, a relay in circuit with said collector and said power source energizing a first indicating circuit in response to said first voltage level and energizing a second indicating circuit in response to said second voltage level.

References Cited in the file of this patent

UNITED STATES PATENTS

| | | |
|---|---|---|
| 1,459,391 | Clausen | June 19, 1923 |
| 2,165,569 | Obermaier | July 11, 1939 |
| 2,217,797 | Donovan | Oct. 15, 1940 |
| 2,269,019 | Hall | Jan. 6, 1942 |
| 2,456,617 | Burch | Dec. 21, 1948 |
| 2,468,676 | Liben | Apr. 26, 1949 |
| 2,635,137 | Basham | Apr. 14, 1953 |
| 2,659,067 | Peters | Nov. 10, 1953 |
| 2,781,505 | Grant | Feb. 12, 1957 |
| 2,783,341 | Wisman | Feb. 26, 1957 |
| 2,799,851 | Moore | July 16, 1957 |

FOREIGN PATENTS

| | | |
|---|---|---|
| 628,561 | Great Britain | Aug. 31, 1949 |